June 19, 1962  O. THIEL ETAL  3,039,236
UNIVERSALLY ADJUSTABLE BUFFING AND LIKE APPARATUS
Filed Nov. 2, 1959  7 Sheets-Sheet 2

FIG. 2

INVENTORS
OTTO THIEL
HAROLD A. LANE
BY Whitmore Hulbert
Belknap
ATTORNEYS

June 19, 1962 — O. THIEL ETAL — 3,039,236
UNIVERSALLY ADJUSTABLE BUFFING AND LIKE APPARATUS
Filed Nov. 2, 1959 — 7 Sheets-Sheet 3

INVENTORS
OTTO THIEL
HAROLD A. LANE
BY Whittemore, Hulbert &
Belknap
ATTORNEYS

June 19, 1962     O. THIEL ETAL     3,039,236
UNIVERSALLY ADJUSTABLE BUFFING AND LIKE APPARATUS
Filed Nov. 2, 1959     7 Sheets-Sheet 7

INVENTORS
OTTO THIEL
HAROLD A. LANE
BY Whittemore, Hulbert
DeKnaap
ATTORNEYS

United States Patent Office 3,039,236
Patented June 19, 1962

3,039,236
UNIVERSALLY ADJUSTABLE BUFFING
AND LIKE APPARATUS
Otto Thiel, Detroit, and Harold A. Lane, Birmingham, Mich., assignors to Midwest Supply and Manufacturing Company, Ferndale, Mich., a corporation of Michigan
Filed Nov. 2, 1959, Ser. No. 850,461
8 Claims. (Cl. 51—99)

The present invention relates to improvements in an apparatus for buffing or similarly finishing elongated parts which may be of curved, non-rectilinear contour, as well as curved in cross section at 90° to their length, such as an automobile bumper. The patent to Lane 2,748,546 of June 5, 1956, illustrates and describes equipment of this nature, in which the bumpers or like parts to be buffed or polished are moved in the direction of their length past a buffing wheel of the apparatus, and transversely of the rotative axis of the wheel.

It is a general object of the invention to provide buffing apparatus such as is shown in the Lane patent having improved provisions for manually adjusting the axis of the buffing wheel in a compound way, thereby enabling the wheel to be properly disposed for full surface contact with the rounded cross section of the bumper or other object being polished, with an appropriate compensating or counter adjustment enabling the axis to be properly positioned to follow the surface contour of the work as the latter passes longitudinally beneath the wheel, the wheel rising and falling in following the longitudinal curvature of the object.

Another object is to provide improved apparatus of the sort in question, in which provision is made for readily and quickly adjusting longitudinally certain supporting shafting by which the buffing wheel and its drive motor are mounted, thereby enabling the weight of the motor to be properly balanced, as required.

More specifically, it is an object to provide apparatus having the improvement just mentioned, in which coaxial tubular shafts or arms are supported for swinging adjustment adjacent one end thereof by means of a universal mount, with these shafts guided by means in general accordance with the disclosure of the Lane patent to restrain movement of the universally mounted shafts or arms to a single plane passing through the universal pivot axis. In combination with a motion limiting mount of this character, the invention provides an adjustment in the form of a slidable guide for the opposite end of the shafts or arms whereby a limited adjustment of the outer, wheel carrying extremity of one thereof is had, in order to compensate for wear on the wheel.

Yet another object is to provide an improved buffing machine in which one of the arms or shafts has provision for adjusting the same axially relative to the other in order to take up tension of a drive belt coupling the polishing or buffing wheel with its drive motor.

Another specific object is to provide a buffing wheel featuring motion limiting means as described to maintain the swing of the wheel supporting shafts or arms in a plane intersecting their universal pivot axis, this structure involving a parallel arm type of mount for the shafts or arms upwardly of their universal support, together with an individual rotative adjustment of such mounting means under control of a worm and worm wheel actuator for the mount in question.

A further specific object is to provide a universally mounted buffing wheel support, in which the universal joint of the structure is in part constituted by an individually actuated adjusting ring, also operated through the agency of a worm and worm wheel actuator, whereby the shafts and previously described mount for the parallel arm motion limiting means may also be adjusted bodily about the longitudinal axis of the shafts or arms, the parallel arm feature then affording a compensating adjustment about the same axis for the purpose of maintaining proper engagement of the buffing wheel with the work.

The foregoing as well as other objects will become more apparent as this description proceeds, especially when considered in connection with the accompanying drawings illustrating the invention, wherein.

As indicated above, the apparatus or equipment of the present invention is, in general, in accordance with what is illustrated and described in the patent to Lane 2,748,546, identified above, in that it features a universal mount adjacent one end of an arm or shaft assembly, by which a buffing or polishing wheel is mounted for multiple and universal adjusting movements, thereby enabling the axis of the spindle on which the wheel is borne to be widely adjusted for proper running contact with the longitudinal surface of a part, such as an automobile bumper, which is curved in longitudinal contour as well as in transverse cross section. In common with the Lane patent, the mount for the wheel in accordance with the present invention involves a parallel arm-type of arrangement for limited swinging of the arm assembly to a plane passing through the axis of its universal adjustment. In further accordance with the equipment of the Lane patent, an adjustment of the arm assembly and its parallel arm mounting and limiting means is possible about the axis of the arms or shafts of the assembly, this being accomplished by the provision of a plate carried by one of the universally swivel primary members of the universal joint. However, in accordance with the present improvement, the adjustment is made with increased ease and speed by means of an individual worm and worm gear actuator for the plate in question.

Figure 1:
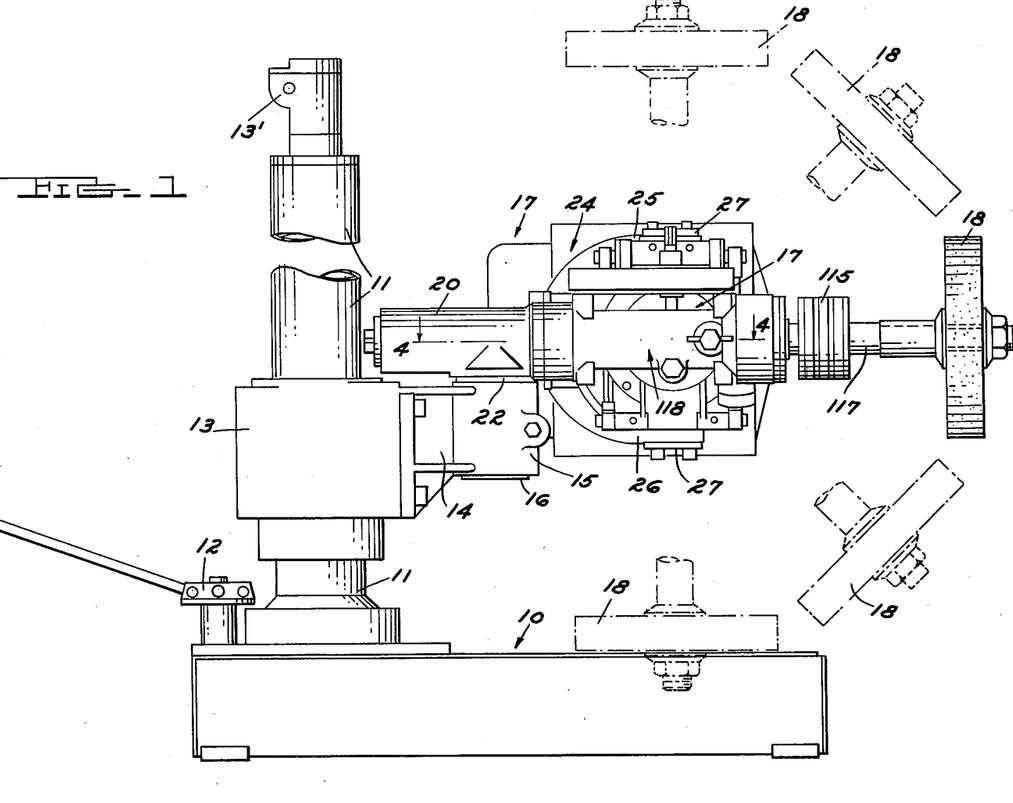
FIG. 1 is a view in side elevation, partially broken away, of the improved apparatus of the invention, selectively available adjustable positions of its buffing or finishing wheel being indicated in solid line and in dot-dash line, this figure being as viewed from arrow 1 in FIG. 2.
Figure 2:
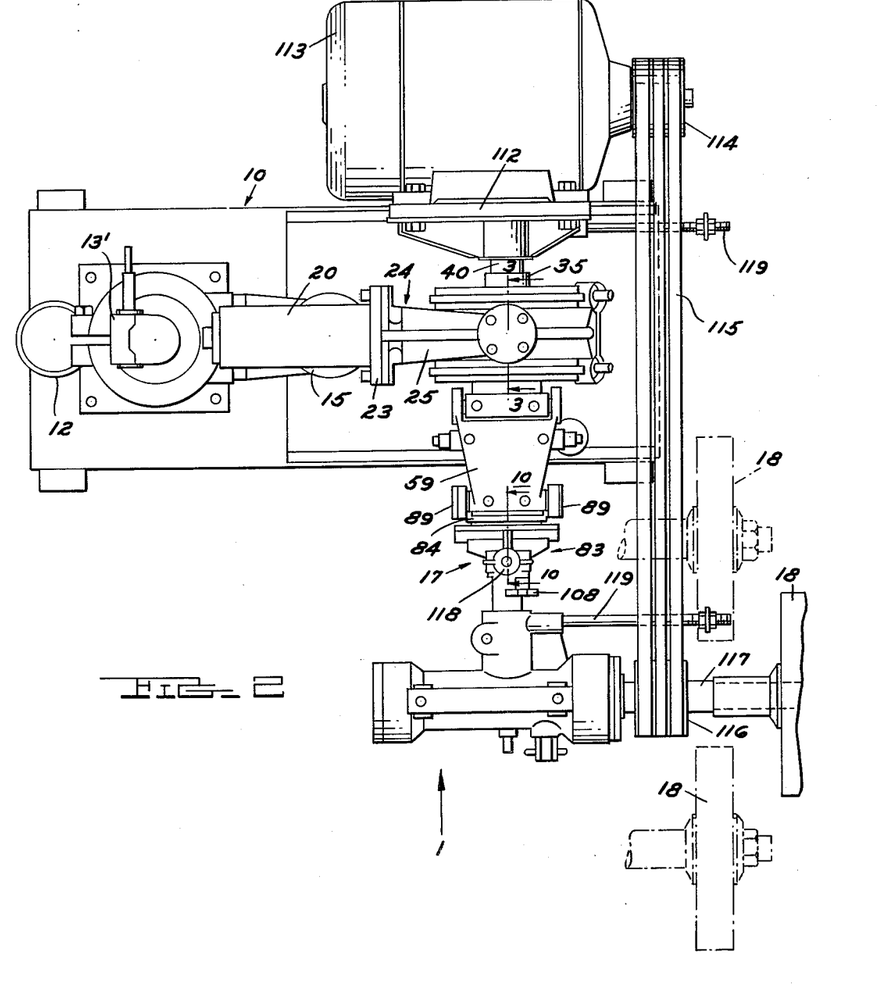
FIG. 2 is a fragmentary top plan view of the equipment, also indicating in solid and dot-dash line various longitudinally adjustable positions of the buffing wheel.

Referring first to FIGS. 1 and 2, the reference numeral 10 generally designates a fixed floor base sustaining an upright column 11, and provisions not particularly germane to the invention, such as a capstan actuator 12 and appropriate connections, enable column 11 to be adjustable longitudinally along base 10 for convenience in positioning the apparatus in relation to a conveyor (not shown) by which bumpers or like elongated work pieces are transported past the buffing or polishing wheel of the apparatus.

A suitable massive collar 13 surrounds column 11 and appropriate provisions or means 13' of a conventional character may be made to adjust the column and structure supported thereby (to be described) vertically along the column 11. A heavy bracket 14 projects laterally from collar 13, supporting at its outer end a further split collar 15 which internally receives a cylindrical stem 16 by which a buffing or polishing head in accordance with the invention, generally designated 17, is mounted. It is seen that by loosening the collar 15, a 180° adjustment of the head 17 about the vertical axis of stem 16 is possible, with corresponding adjustment in a horizontal plane of the head 17 and its buffing or polishing wheel 18. As indicated in solid and dot-dash line in FIG. 1, a further adjustment of comparable scope in a vertical plane is made possible by the universal mounting provisions to be described.

Figure 5:
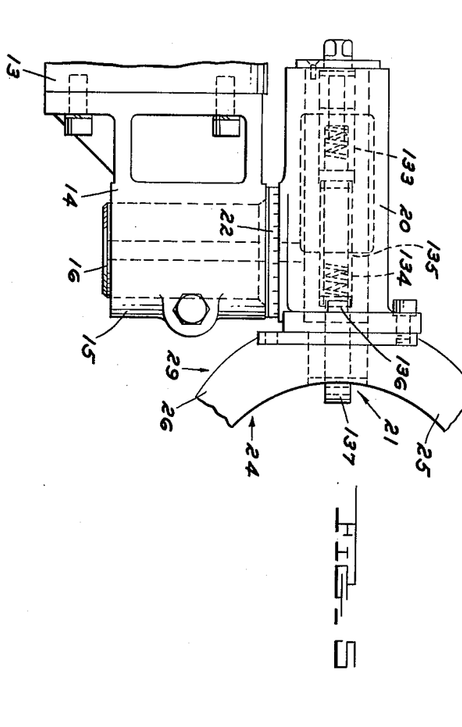
FIG. 5 is a fragmentary elevational view, as viewed from arrow 5 in FIG. 4, showing features of a rotative adjustment and a cam and follower type "hunting" device enabling a degree of lost motion action of the buffing wheel as it follows along the contour of the work.

As indicated in FIG. 5, the stem 16 carries on its top a horizontally extending housing 20, within which certain components of a lost motion, so-called hunting device, generally designated 21, may be mounted; and a calibrated ring 22 may be fixedly mounted on housing 20 coaxially with the stem 16 to indicate the degree of adjustment in the horizontal plane of the head 17, in reference to the axis of the stem.

At its outer end the housing 20 carries a flange 23 upon which a rugged, horizontally opening yoke 24 for the universal mount of the head 17 is carried, the upper and lower arms of this yoke being designated 25 and 26, respectively. They are equipped at their outer ends with ball bearings 27, by which one gimbal ring 28 of a universal mount or joint for the head 17, which joint is generally designated 29, is mounted to swing on a vertical axis.

Figure 3:
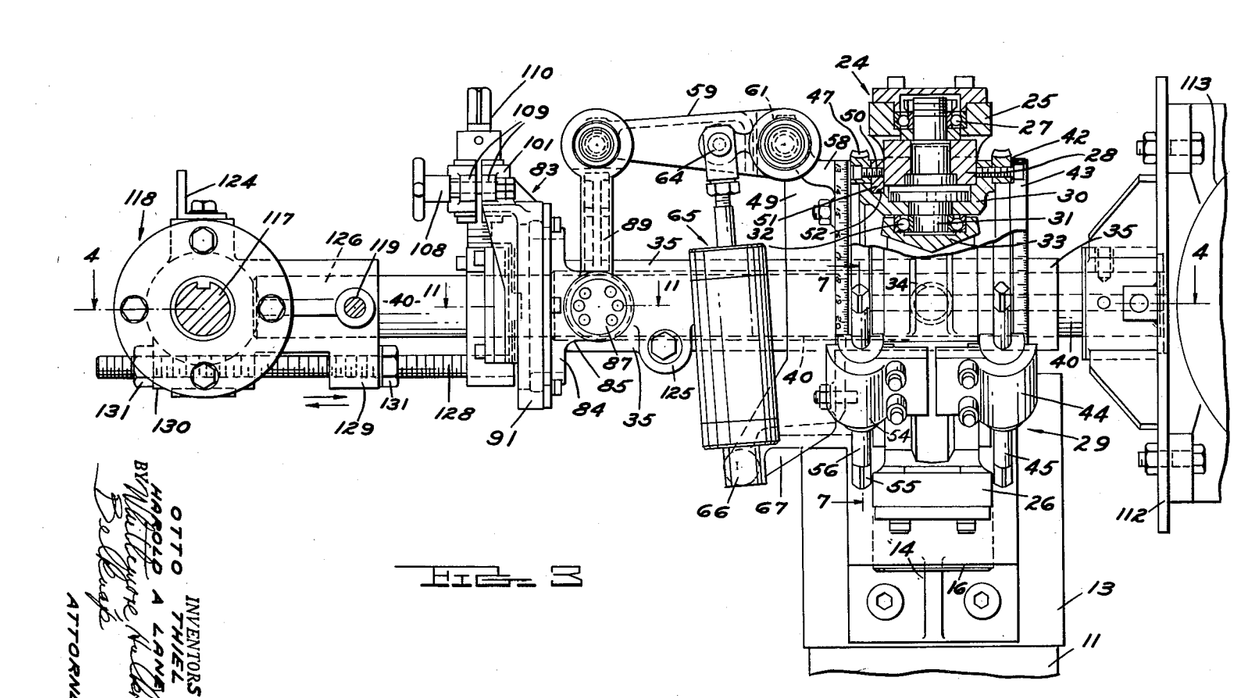
FIG. 3 is a fragmentary elevational view in enlarged scale, partially broken away and in vertical cross section along line 3—3 of FIG. 2.

As a component associated with the ring 28, the invention contemplates the use, as shown in FIG. 3, of an adjusting ring 30 coaxial therewith, which adjusting ring carries diametrically opposed, inwardly extending trunnions 31 and ball bearings 32 which swivel an inner ring 33 of the universal joint.

Inner ring 33 (see FIG. 4) in turn carries diametrically opposed, inwardly extending trunnions 34 by which an elongated tubular rod, arm or shaft 35 is mounted for swing about a horizontal axis, thus completing a universal joint mount for the shaft (and associated wheel-mounting shaft parts, to be described) by which the wheel 18 may be swung to any desired position of adjustment.

Figure 4:
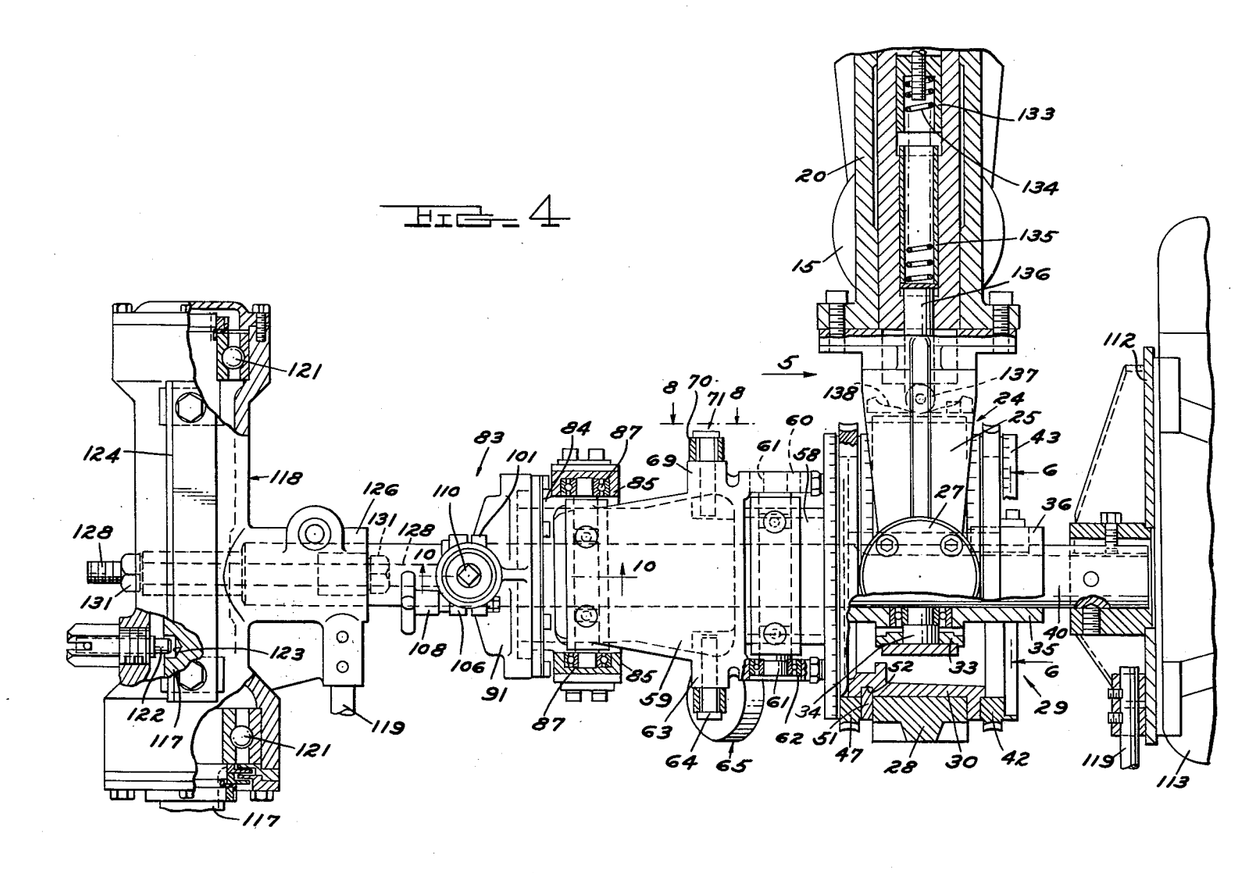
FIG. 4 is a fragmentary view, also, in enlarged scale, partially broken away and in horizontal section along line 4—4 of FIGS. 1 and 3.
Figures 6, 7, 9:
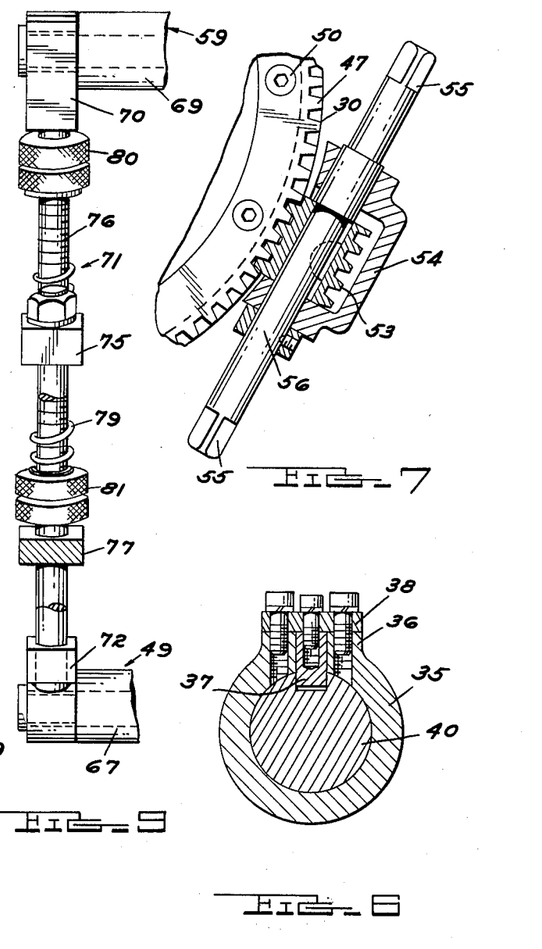
FIG. 6 is a view in enlarged scale and in transverse cross section along line 6—6 of FIG. 4.
FIG. 7 is a fragmentary view in enlarged scale and cross section on line 7—7 of FIG. 3, showing a worm and worm wheel adjustment.
FIG. 9 is a fragmentary view of this device, partially broken away, and as viewed from line 9—9 of FIG. 8.

As shown in FIGS. 4 and 6, the tubular arm or shaft 35 is provided, adjacent one end thereof, with an upper boss 36, and a key or spline 37 of relatively short axial length is received and properly held in this boss, as by a cap 38 bolted thereto, for the purpose of drivingly connecting to the arm or shaft 35 an inner elongated, wheel-mounting arm or shaft 40 of solid section, the shaft 40 thus having a suitable guide for longitudinal motion within shaft 35. Thus the two shafts are keyed for motion as a unit in the adjusting thereof about their common axis.

Referring again to FIG. 3, the adjusting ring 30 is provided for the purpose of enabling its selective adjustment, along with the inner universal ring 33 and shafts 35, 40 as a unit, about the outer universal ring 28 and its axis. To this end, a worm gear or wheel 42 of diameter approximating that of ring 30 is bolted or otherwise secured to the outer surface of the latter, with a calibrated further ring 43 to indicate the degree of adjustment. A worm housing member 44 is bolted to one side of the outer universal ring 28; and a worm is mounted in an axially restrained, rotative manner within housing 44, meshing with worm wheel 42. The ends 45 of the worm (which is in all respects similar to what is shown in FIG. 7) project outwardly of housing 44 and are squared for the reception of a suitable tool used in rotating worm wheel 42 and the attached adjusting ring 30. Thus, if it is desired to adjust the position of the entire shaft assembly, including the shafts 35, 40 and associated parts, to position the axis of wheel 18 desirably in regard to the work, this is done by operation of the worm gear 42 in the fashion described. In the event such adjustment calls for a compensating adjustment in order to return the buffing surface of wheel 18 for proper contact along the work surfaces, this may be done without altering the original adjustment by manipulation of a further worm wheel or gear 47 to rotatably adjust, about the shaft axis, further shaft mounting structure on the opposite axial side of the adjusting ring 30, whose adjustment is relative to the last named ring.

The structure just mentioned essentially comprises a mounting bracket 49 of suitably massive and flanged construction, which has the further worm gear 47 bolted or otherwise fixedly secured thereto on an inner side facing the adjacent side of adjusting ring 30. The worm gear is of substantially the same diameter as the ring 30, and is in turn secured, as by screws 50, to a guide ring 51 adapted to run in an outer groove 52 about the periphery of adjusting ring 30. Referring to FIG. 7 in conjunction with FIG. 3, the worm gear 47 is meshingly engaged by a worm 53 rotatable and axially restrained in a worm housing 54 similar to the housing 44, and similarly bolted to the exerior of the outer universal ring 42.

The plate 49 is operatively connected to further shaft adjusting parts in a manner to be described, and when it is desired to make a compensating adjustment of the tubular and solid shafts 35, 40, respectively, about their common axis, and relative to the adjusting ring, i.e., without an adjustment of the last named ring, this is done by manipulating with a suitable tool one of the squared ends 55 of a shaft 56 keyed to the worm 53 and projecting externally of the worm housing 54, as shown in FIG. 7. As indicated above, the structure of the worm within the other housing 44 is similar.

Provisions in accordance with the general principle of the Lane patent are employed for limiting the swinging movement of the arms or shafts 35, 40 to a plane through the universal axis of the universal joint 29, although improved means are provided to connect a parallel arm device for this purpose to the shafting. Thus, the adjustable mounting plate 49 is provided adjacent its top with an outwardly and upwardly projecting bracket 58, and a swinging bracket 59 is provided with a pair of spaced ears or bosses 60 which are suitably journalled on a shaft 61 extending through the plate bracket 58, as by ball bearings 62 applied to trunnion ends of the shaft 61. At one of its sides the bracket 59 has an integral boss 63 receiving a pin 64 to pivotally connect to the bracket one end of an adjustable pneumatic plunger and cylinder device 65. The opposite end of this device is pivoted at 66 to a fixed bracket extension 67 of the adjustable mounting plate 49; and the pneumatic device 65 is operated through suitable valve provisions (not germane to the invention and of the type employed in the Lane patent) for lifting the wheel 18 away from the work when desired, or adding working pressure between the work and wheel.

Figure 8:
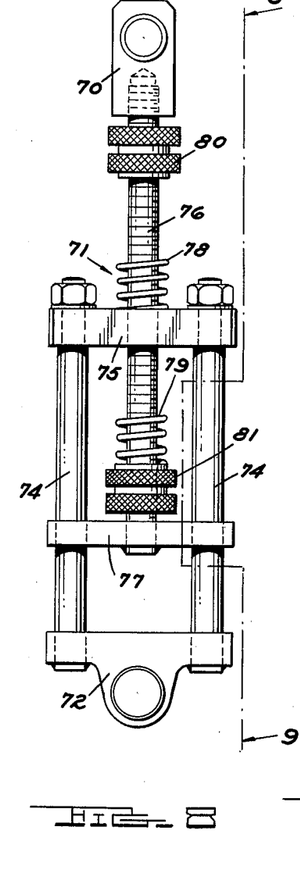
FIG. 8 is an elevational view of a spring cushioning device for the wheel supporting arm structure of the equipment, being as viewed from line 8—8 of FIG. 4.

Swinging bracket 59 is also provided on its opposite side with a further boss 69, to which (as illustrated in FIGS. 8 and 9) a coupling 70 pivotally connects one end of a suitable spring biasing device, generally designated 71. The opposite end of this device is pivoted, as by a yoke 72, to the adjustable mounting plate 49, on an axis corresponding to that of the pivotal connection 66 of the pneumatic device 65.

The function of the spring device 71 is to act as a bumper or dampening means between the swinging bracket 59 and bracket extension 67 to cushion the stoppage of wheel movement. To this end, the device 71 may comprise a pair of parallel rods 74 fixed at their lower ends to a yoke or cross piece 72 pivoted on extension 67 and at their upper ends to a further cross piece 75. A threaded rod 76 extends through the cross piece 75 and is adjustably connected at its upper end to the coupling 70. The lower end of rod 76 is fixed to a cross head 77 which is guided for sliding movement on the rods 74. Coil springs 78, 79 act respectively between an adjusting nut 80 threaded on rod 76 and the upper cross piece 75, and between the last named cross piece and an adjusting nut 81 threaded on rod 76 adjacent the cross head 77. Nuts 80, 81 may be adjusted to vary the wheel movement, with the springs 78, 79 cushioning the extremes of this movement.

Figure 11:
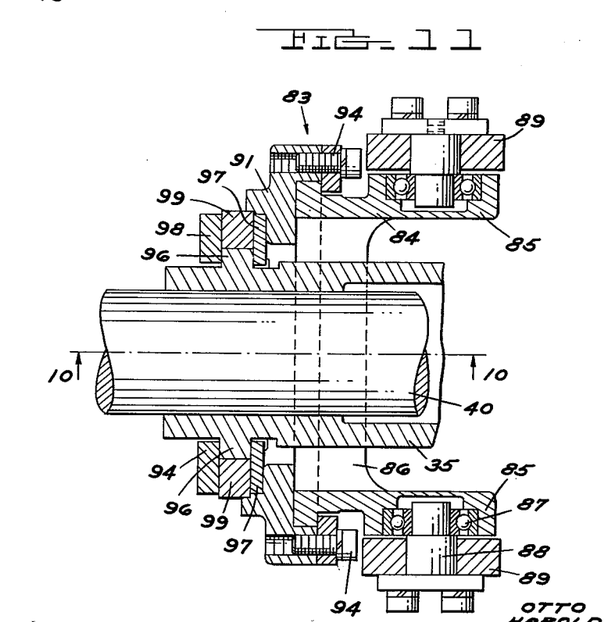
FIG. 11 is a fragmentary view in horizontal section along line 11—11 of FIG. 10.

The reference numeral 83 generally designates an adjusting mechanism whose purpose is to enable wear on the wheel to be compensated for by adjusting the wheel to or from the work in accordance with its existing diameter. Mechanism 83 comprises an annular mounting plate, sleeve or ring 84 which is provided on its inner side with a pair of similar, diametrically opposed ears or bosses 85. As shown in FIGS. 3, 4 and 11, the sleeve or ring 84 is not directly connected to either of the shafts 35, 40, but has an axial end opening 86 of diameter considerably greater than the tubular shaft 35, which receives the shafts in question for adjusting movement.

Ears or bosses 85 of the sleeve or ring 84 carry ball bearings 87 which rotatably mount inwardly projecting trunnions 88 on the lower end or edge of a pair of upright links 89; and the upper ends of these links are pivotally connected by suitable similar antifriction means to the outer free extremity of the swinging bracket 59, at opposite sides of the latter as shown in FIG. 2.

Figure 10:
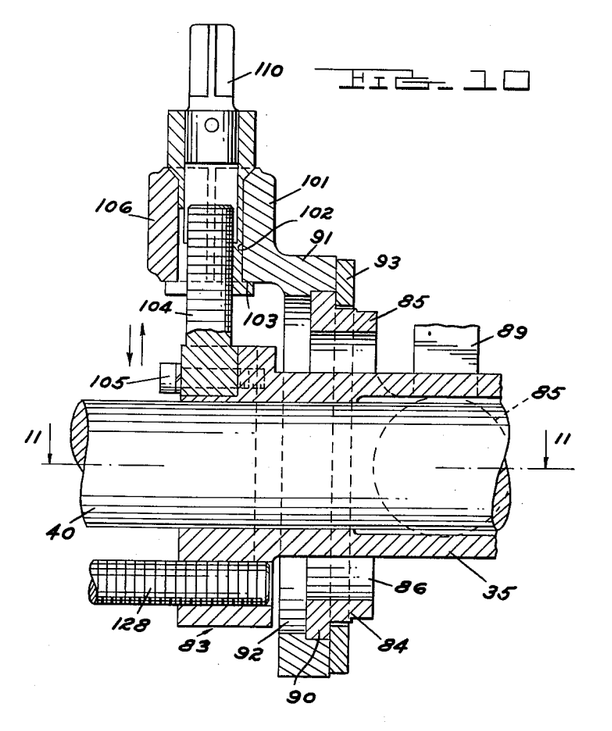
FIG. 10 is a fragmentary view in vertical section along line 10—10 of FIGS. 4 and 11, showing details of an improved adjustment for wheel wear in accordance with the invention.

Referring to FIGS. 10 and 11, the sleeve 84 has an annular radially extending flange 90 surrounding its mouth or opening 86, and a fixed annular mounting bracket 91 is piloted or seated upon the flange 90. Bracket 91 has an axial mouth 92 of diameter greater than that of the sleeve or ring 84, and a clamp ring 93 engages flange 90 of sleeve 84 to hold bracket 91 on the latter, as shown in FIG. 3, the ring 93 being secured to the bracket by suitable screws or bolts 94 (FIG. 11). Thus sleeve 84 may be locked in any angularly adjusted position to which it is moved by rotation of worm gear 47 to swing the bracket 59 to which the sleeve 84 is pivotally articulated, thus to adjust the inclination of the plane in which the dual shaft assembly swings.

The outer end of the shaft or arm 35 is formed to provide upwardly projecting side guide elements 96 which are received in an upright way carried by mounting bracket 91. This way may be constituted by a pair of inner upright way members 97, a pair of outer way members 98 paralleling and axially spaced therefrom, and a pair of inner spacer members 99 interposed therebetween with these three pairs of members bolted or otherwise secured to the forward axial end of bracket 91 to constitute parallel upright ways receiving the projecting guide or way portions 96 at the outer, forward end of tubular shaft 35. Referring to FIG. 10 in conjunction with FIG. 3, the upper portion of mounting bracket 91 carries a forward extending part 101 providing a generally semi-cylindrical seat 102 on an upright axis which receives a split bushing 103 which is internally threaded for engagement with an upright stem 104. Stem 104 is suitably secured by a screw or bolt 105 to the forward end of tubular shaft 35, and a semi-cylindrical cap 106 is employed in conjunction with the boss 101 to clamp the bushing 103 in place, with the stem 104 threadedly received in the bushing. FIG. 3 illustrates the use of a threaded hand piece or pieces 108 engaging through bosses 109 in bracket extension 101 and cap 106 to clamp the bushing and stem. In order to effect adjustment of the stem 104, and thus vertically position shafts 35, 40 within the mounting sleeve and bracket 91 as desired, the bushing 103 has pinned or otherwise secured to its upper end a square-ended member 110.

Thus by manipulation of member 110 the wheel may be adjusted to and from the work to regulate buffing pressure.

As illustrated in FIGS. 1, 2, 3 and 4, the inner shaft 40 of the apparatus has suitably secured fixedly thereto a flanged mounting plate 112 by which a motor 113 of suitable rating is mounted; and pulleys 114 on the shaft of the motor receive power transmission belts 115 drivingly connecting the same with pulleys 116 on a shaft or spindle 117 by which the buffing or finishing wheel 18 is borne. Spindle 117 is suitably mounted for rotation in a shaft or spindle housing 118 carried on an adjacent end of the inner, solid-section arm or shaft 40. If desired, the motor mounting plate 112 and the spindle housing 118 may be employed to mount transversely extending rods 119 for the support of a suitable protective shield (not shown) for the belting 115. Suitable provision may be made for the adjustment of the wheel spindle 117 in the housing 118 in the direction of its axis, see FIG. 2, thereby enabling an adjustment of the wheel 18 in this direction, if desired, such provisions constituting no part of the invention, however. Suitable roller bearings 121 journal the spindle in the housing, and provision may be made for withdrawing the spindle axially from the housing, if desired, illustrated as being in the form (FIG. 4) of a locking pin 122 releasably receivable in an annular groove 123 in the spindle 117, the pin 122 being withdrawn laterally when removal is desired.

Should it not be possible to secure the desired work pressure between wheel and workpiece by manipulation of the adjusting mechanism 83 (FIGS. 3, 4, 10 and 11), due to the use of motors, wheel hoods, compound applicators, etc. of too light weight, additional weight may be hung on the angle bar 124 atop spindle housing 118. Should the wheel end be too heavy, similar additional weight may be applied to the motor mounting plate 112. Furthermore, work pressure may be regulated by adjusting the air pressure of air cylinder 65 (FIG. 3).

The invention also contemplates provisions for adusting the inner, solid section wheel supporting shaft 40 axially, relative to the outer tubular shaft 35, to balance the weight of the motor 113. To this end, the tubular shaft 35 may be split between bosses 125 adjacent its outer end, and the spindle housing 118 clamped on the outer end of shaft 40, as by means of a split housing extension 126. Thus, upon loosening of the tubular shaft 35 at split boss 125, the shaft 40 may be adjusted axially in one direction or another, the key 37 (FIGS. 4 and 6) guiding the same in this motion, after which the shafts may be reclamped together.

For the purpose of enabling an independent adjustment of the wheel spindle 117 axially of the shaft 40, in order to maintain proper tension of belts 115 following an adjustment of the sort just described, the outer end of tubular shaft 35 may be employed as a fixed support for a threaded rod 128 extending in the direction of shaft 40, with a connection of this shaft in bosses 129, 130 of the mounting extension 126, and with takeup nuts 131 to clamp the housing in a properly adjusted position for the purpose.

Thus it is seen that the invention provides various improvements for the simplified and expedited making of original and compensating adjustments of the shafts 35, 40 about their common axis, for adusting the same linearly or in a direction of their radius, in order to compensate for wheel wear, for adjusting to maintain proper balance and compensate for motor weight, for adjusting to maintain proper belt tension and the like.

It is sometimes considered desirable, in the operation of polishing equipment of the present sort, to make provision for a slight lost motion hunting action of the wheel as the work runs along the same, i.e., a slight rocking of the wheel such as would not otherwise be possible in the event of a more rigid support therefor. If provisions of this sort are desired, they may be of the character illustrated in FIGS. 4 and 5 of the drawings.

Thus, in accordance with the invention, the housing 20, at the top of the stem 16 by which buffing head 17 is mounted on an upright axis, may receive at one end a fixed tubular insert 133 serving as a stop for a coil compression spring 134, and at its other end a further insert 135 receiving the opposite end of the spring. Insert 135 is closed at this end and axially abuts the end of a plunger 136 guided in housing 20, the opposite end of the plunger 136 journalling a cam follower roller 137.

Roller 137 abuts a cam surface 138 formed across the adjacent outer peripheral surface of the outer universal ring 28, and, while normally centering that ring on its trunnion connection at bearings 27 to the arms 25, 26 of yoke 24, permits a slight lost motion rocking or hunting action of the ring 42 about those trunions, sufficient to enable a slight play of the wheel 18 as the work piece passes in buffing contact with the wheel.

What we claim as our invention is:

1. A machine for performing a buffing or like work finishing operation, comprising a shaft unit including a pair of elongated, coaxially telescoping shafts, one of which has means for supporting a work finishing tool, means for mounting the other of said shafts for universal adjustment about a universal pivot point to present said tool, as mounted by said shaft unit, at different angles to a work piece, a device operatively connected to said shaft unit and providing for a movement of said shaft unit and tool toward and from said work piece which is limited to one of various planes passing through said universal pivot point, and means operatively connecting said shaft unit to said device for adjustment of the shaft unit relative to said device in a plane transverse of the common axis of the shafts.

2. A machine for performing a buffing or like work finishing operation, comprising a shaft unit including a pair of elongated, coaxially telescoping shafts, one of which has means for supporting a work finishing tool, means for mounting the other of said shafts for universal adjustment about a universal pivot point to present said tool, as mounted by said shaft unit, at different angles to a work piece, a device operatively connected to said shaft unit and providing for a movement of said shaft unit and tool toward and from said work piece which is limited to one of various planes passing through said universal pivot point, said device comprising a bracket having a fixed mount and rotatably adjusted relative to said mount about an axis approximately coincident with the common axis of said shafts, and means operatively connecting said shaft unit to said bracket for adjustment of the shaft unit relative to said device in a plane transverse of the common axis of the shafts.

3. A machine for performing a buffing or like work finishing operation, comprising a shaft unit including a pair of elongated, coaxially telescoping shafts, one of which has means for supporting a work finishing tool, means for mounting the other of said shafts for universal adjustment about a universal pivot point to present said tool, as mounted by said shaft unit, at different angles to a work piece, a device operatively connected to said shaft unit and providing for a movement of said shaft unit and tool toward and from said work piece which is limited to one of various planes passing through said universal pivot point, and means operatively connecting said shaft unit to said device for adjustment of the shaft unit relative to said device in a plane transverse of the common axis of the shafts, said adjusting means comprising a guide member on said device and a further guide member on said tool supporting shaft operatively engaging said first named member to guide said last named shaft and said shaft unit for said adjustment transverse of said common shaft axis.

4. A machine for performing a buffing or like work finishing operation, comprising a shaft unit including a pair of elongated, coaxially telescoping shafts, one of which has means for supporting a work finishing tool, means for mounting the other of said shafts for universal adjustment about a universal pivot point to present said tool, as mounted by said shaft unit, at different angles to a work piece, a device operatively connected to said shaft unit and providing for a movement of said shaft unit and tool toward and from said work piece which is limited to one of various planes passing through said universal pivot point, said device comprising a bracket having a fixed mount and rotatably adjusted relative to said mount about an axis approximately coincident with the common axis of said shafts, and a linkage operatively connecting said bracket to said shaft unit to confine movement of the latter to swinging movement in said universal pivot point plane in any rotatively adjusted position of said bracket, and means operatively connecting said shaft unit to said linkage for adjustment of the shaft unit relative to said device in a plane transverse of the common axis of the shafts.

5. A machine for performing a cuffing or like work finishing operation, comprising a shaft unit including a pair of elongated, coaxially telescoping shafts, one of which has means for supporting a work finishing tool, means for mounting the other of said shafts for universal adjustment about a universal pivot point to present said tool, as mounted by said shaft unit, at different angles to a work piece, a device operatively connected to said shaft unit and providing for a movement of said shaft unit and tool toward and from said work piece which is limited to one of various planes passing through said universal pivot point, said device comprising a bracket having a fixed mount and rotatably adjusted relative to said mount about an axis approximately coincident with the common axis of said shafts, and a linkage operatively connecting said bracket to said first named guide member to confine movement of the latter to swinging movement in said universal pivot point plane in any rotatively adjusted position of said bracket, and means operatively connecting said shaft unit to said linkage for adjustment of the shaft unit relative to said device in a plane transverse of the common axis of the shafts, said adjusting means comprising a guide member on said device and a further guide member on said tool supporting shaft operatively engaging said first named member to guide said last named shaft and said shaft unit for said adjustment transverse of said common shaft axis.

6. A finishing machine in accordance with claim 1, and further comprising means for the longitudinal adjustment of said tool supporting shaft relative to said other shaft along the common axis of said shafts.

7. A finishing machine in accordance with claim 5, and further comprising means for the longitudinal adjustment of said tool supporting shaft relative to said other shaft along the common axis of said shafts.

8. A finishing machine in accordance with claim 5, in which said bracket comprises a ring member carried by said fixed mount for its rotative adjustment, to which said linkage is pivotally connected, said first named guide member comprising an annular member through which said tool supporting shaft extends.

References Cited in the file of this patent

UNITED STATES PATENTS

| | | |
|---|---|---|
| 952,866 | Baumgardner | Mar. 22, 1910 |
| 2,345,986 | Mentley et al. | Apr. 4, 1944 |
| 2,748,546 | Lane | June 5, 1956 |